United States Patent [19]

Rottner et al.

[11] Patent Number: 5,078,757

[45] Date of Patent: Jan. 7, 1992

[54] PROCESS FOR THE PRODUCTION OF GASEOUS OXYGEN UNDER PRESSURE

[75] Inventors: Thomas Rottner, Recloses; Sylvie Eteve, Fontenay-Aux-Roses; Léon Hay, Paris, all of France

[73] Assignee: L'Air Liquide, Societe Anonyme Pour L'Etude et L'Exploitation des Procedes Georges Claude, Paris, France

[21] Appl. No.: 524,966

[22] Filed: May 18, 1990

[30] Foreign Application Priority Data

May 24, 1989 [FR] France .................. 89 06789

[51] Int. Cl.$^5$ ............................................ B01D 53/04
[52] U.S. Cl. .................................. 55/26; 55/58; 55/62; 55/68; 55/179; 55/387; 55/389
[58] Field of Search ............... 55/25, 26, 31, 58, 33, 55/62, 68, 74, 75, 179, 387, 389

[56] References Cited

U.S. PATENT DOCUMENTS

| | | | |
|---|---|---|---|
| 4,190,424 | 2/1980 | Armond et al. | 55/58 |
| 4,249,915 | 2/1981 | Sircar et al. | 55/26 |
| 4,375,363 | 3/1983 | Fuderer | 55/25 |
| 4,402,712 | 9/1983 | Benkmann | 55/26 |
| 4,472,178 | 9/1984 | Kumar et al. | 55/25 |
| 4,512,778 | 4/1985 | Simonet et al. | 55/26 |
| 4,529,412 | 7/1985 | Hayashi et al. | 55/25 |
| 4,552,571 | 11/1985 | Dechene | 55/25 X |
| 4,566,881 | 1/1986 | Richter et al. | 55/58 X |
| 4,661,125 | 4/1987 | Haruna et al. | 55/26 |
| 4,732,577 | 3/1988 | Koizumi et al. | 55/25 X |
| 4,737,167 | 4/1988 | Ohtani et al. | 55/26 |
| 4,756,723 | 7/1988 | Sircar | 55/33 X |
| 4,840,647 | 6/1989 | Hay | 55/58 X |
| 4,880,443 | 11/1989 | Miller et al. | 55/26 |
| 4,913,709 | 4/1990 | Kumar | 55/26 |
| 4,914,218 | 4/1990 | Kumar et al. | 55/26 |

FOREIGN PATENT DOCUMENTS

| | | |
|---|---|---|
| 0241910 | 10/1987 | European Pat. Off. |
| 0284448 | 9/1988 | European Pat. Off. |
| 0302658 | 2/1989 | European Pat. Off. |
| 2011272 | 7/1979 | United Kingdom |

*Primary Examiner*—Robert Spitzer
*Attorney, Agent, or Firm*—Young & Thompson

[57] ABSTRACT

Gaseous oxygen is produced under a medium pressure which is higher than atmospheric pressure, and lower than a so-called high pressure. The medium pressure may also vary with time after which gaseous oxygen is brought to the high pressure. Each of the adsorbers of a high pressure PSA (Pressure swing Adsorption) adsorption device, undergoes a cycle including the following stage: (a) a stage of first pressure surge from a low pressure of the low pressure cycle to the medium pressure, during which oxygen under a medium pressure is introduced at a first end or outlet end, of the adsorber; (b) a stage of second pressure surge up to the high pressure; (c) a stage of production under high pressure, during which a gas substantially below the high pressure containing at least one component which is more easily adsorbed than oxygen, is introduced through a second end, or inlet end of the adsorber the gas being for example air, the first end being open; and (d) a stage of decompression to the low pressure of the cycle. An apparatus for carrying out this process is also disclosed.

12 Claims, 4 Drawing Sheets

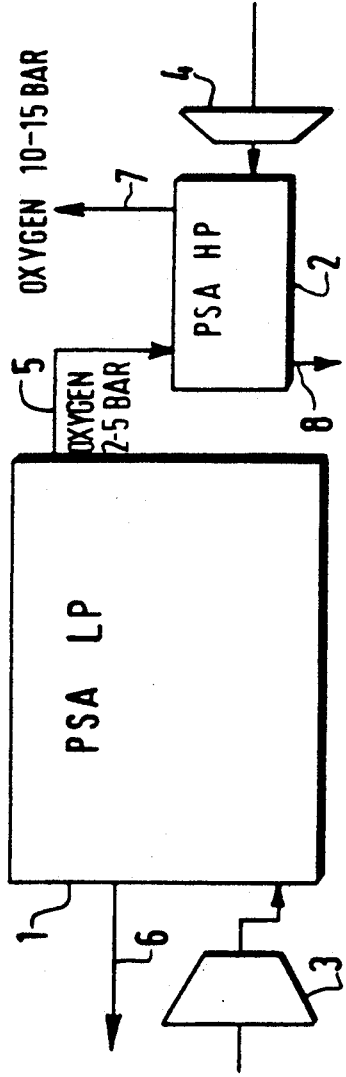
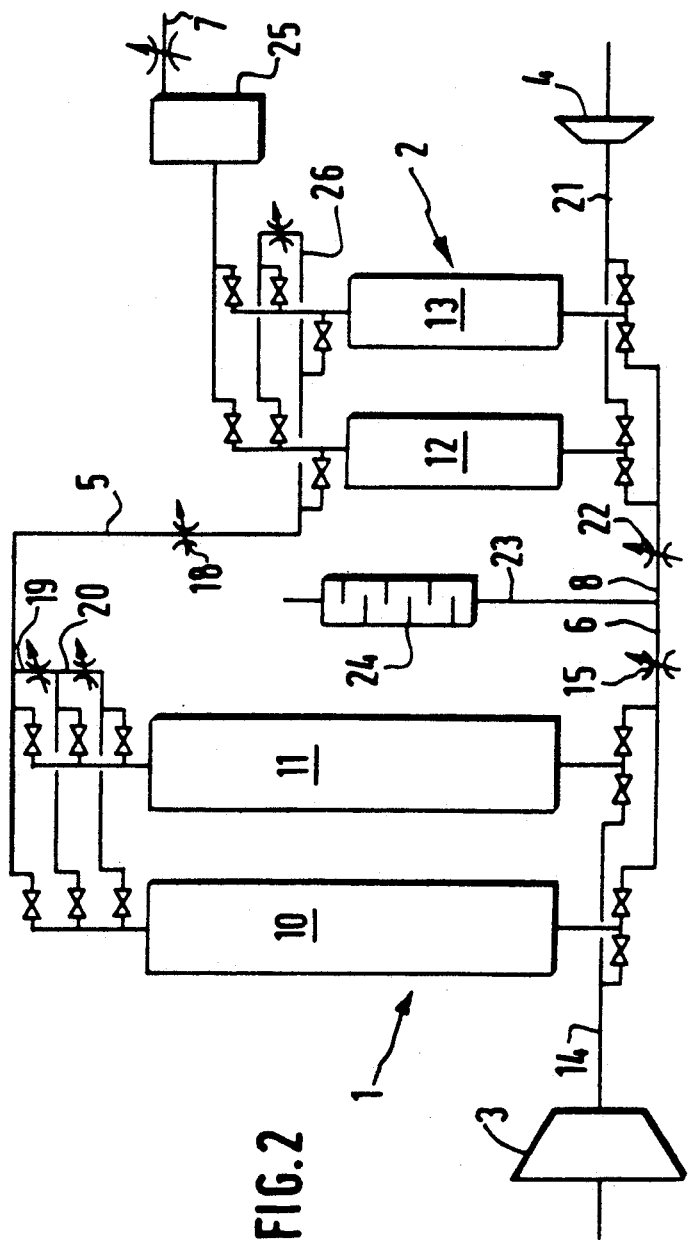
FIG.1
FIG.2

PROCESS FOR THE PRODUCTION OF GASEOUS OXYGEN UNDER PRESSURE

BACKGROUND OF THE INVENTION (a) Field of the Invention

The present invention concerns a process for the production of gaseous oxygen under a so-called high pressure which may vary with time, in which the gaseous oxygen is produced under a medium pressure which is higher than atmospheric pressure but lower than said high pressure, the medium pressure may vary with time, after which the pressure of this gaseous oxygen is raised to the above-mentioned high pressure.

(b) Description of Prior Art

Some processes for the production of oxygen do not permit to directly producing this gas under high pressures of the order of 10 to 15 bars. In particular, the process for the separation of air by adsorption PSA (Pressure Swing Adsorption), which utilises the properties of preferential adsorption of nitrogen by certain zeolite molecular sieves (type 5A or 13X), enables producing oxygen up to a content of the order of 95%. However, the performances of this process decrease when the highest pressure of the adsorption cycle exceeds a few bars. It is then necessary to compress the oxygen produced (this term will designate pure oxygen or a gas with a high oxygen content) by means of an oxygen compressor to reach the high pressure desired.

Oxygen compressors are apparatuses which are much more expensive than air compressors and require highly developed safety measures. Thus, the cost associated with such a compressor can represent up to 25% of the total investment for a PSA installation.

It is an aim of the invention to make it possible to dispense with the oxygen compressor.

SUMMARY OF INVENTION

For this purpose, it is an object of the present invention to provide a process of the type mentioned above, wherein each of the n adsorbers of a high pressure PSA (Pressure Swing Adsorption) adsorption device undergoes a cycle of duration T comprising the following stages, a time gap T/n being provided during the cycle from one adsorber to the next one:

(a) a stage of first pressure surge from a low pressure of the low pressure cycle, to the medium pressure, during which oxygen under a medium pressure is introduced at a first end, or outlet end, of the adsorber;

(b) a stage of second pressure surge up to the high pressure;

(c) a production stage under high pressure, during which a gas substantially under said high pressure containing at least one component which is more easily adsorbed than oxygen, is introduced through a second end, or inlet end, of the adsorber, this gas being for example air, the first end being open; and (d) a stage of decompression to the low pressure of the cycle.

Between stages (c) and (d), the cycle can include a stage for complementary production under high pressure by counter-current decompression of the adsorber, the inlet end being closed.

According to an embodiment, oxygen at medium pressure is produced by separation of air by means of a low pressure adsorption PSA device which operates between the medium pressure and a low pressure which is lower than the latter.

Preferably, the cycle for each adsorber of the low pressure PSA device comprises a production stage at medium pressure which takes place simultaneously as stage (a) of an adsorber of the high pressure PSA device and during which the oxygen outlet end of the adsorber of the low pressure PSA device is connected to said first end of the adsorber of the high pressure PSA device.

It is also an object of the invention to provide an apparatus intended to carry out such a process, and more specifically an apparatus for the production of gaseous oxygen under a so-called high pressure which may vary with time, of the type comprising means for the production of gaseous oxygen under a medium pressure which is higher than atmospheric pressure and lower than the high pressure, this medium pressure may also vary with time, and compression means to bring the gaseous oxygen to the high pressure, characterized in that the compression means comprise a high pressure PSA (Pressure Swing Adsorption) adsorption device the latter comprising means for feeding a gas under high pressure containing at least a component which is more readily adsorbable than oxygen, such as air.

BRIEF DESCRIPTION OF DRAWINGS

A few examples enabling carrying out the invention will now be described with reference to the annexed drawings, in which:

FIG. 1 is a schematic illustration of the principle of the invention;

FIG. 2 is a schematic representation of an apparatus according to the invention utilizing the principle of FIG. 1;

DESCRIPTION OF PREFERRED EMBODIMENTS

Figure 3:
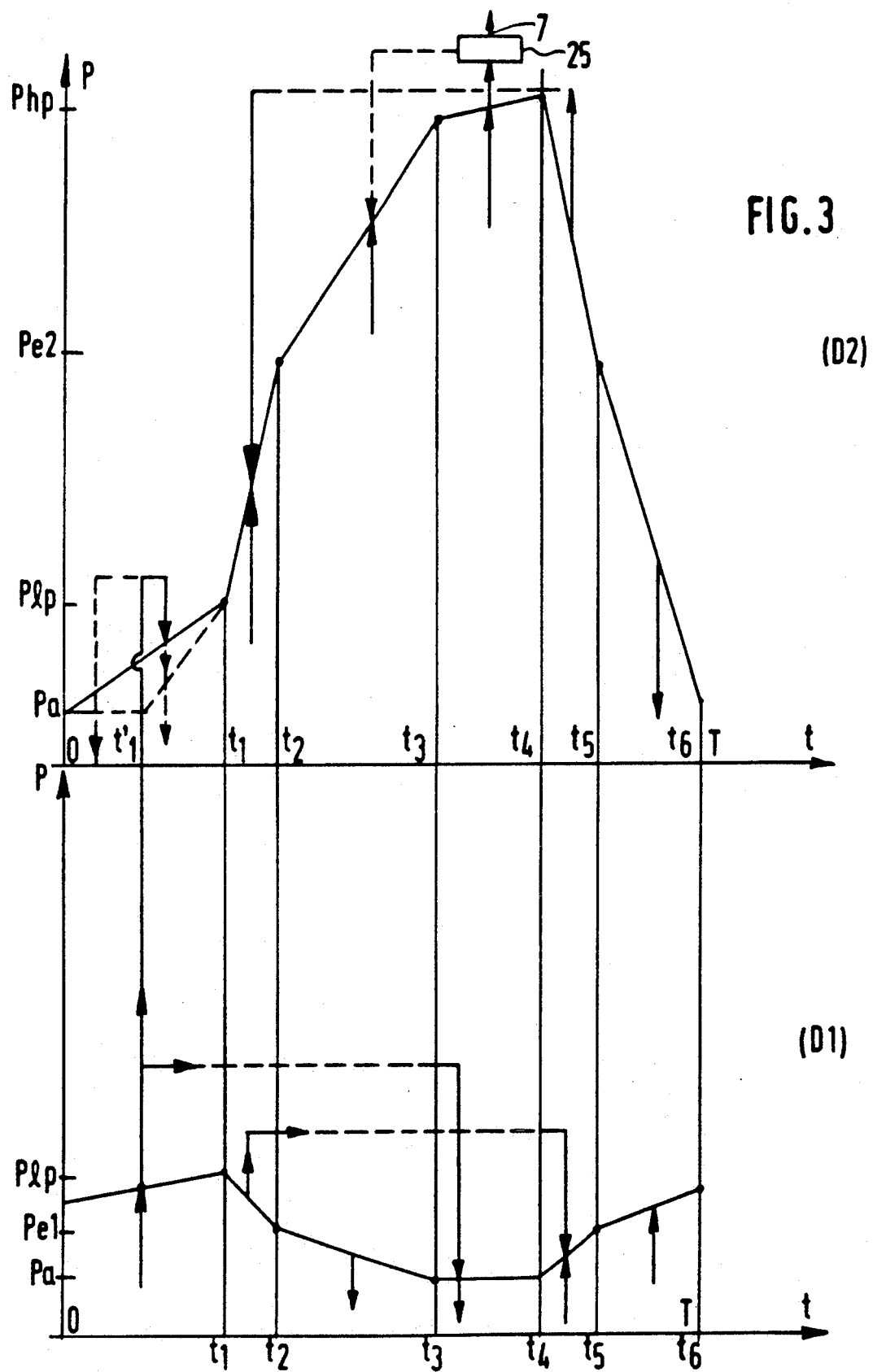
FIG. 3 is a diagram illustrating the operation of the apparatus of FIG. 2.

According to the example of FIG. 1, to produce oxygen under a high pressure of the order of 10 to 15 bars, two PSA adsorption devices are used, namely device 1, so-called low pressure device, and a device 2, so-called high pressure device, a medium pressure air compressor 3 and a high pressure air compressor 4.

Atmospheric air, compressed under a mean pressure of the order of 2 to 5 bars by means of compressor 3, is separated by device 1, which produces on the one hand, through a duct 5, under the mean pressure, oxygen with a purity up to about 95%, and on the other hand, through a duct 6, a residual gas under a low pressure which can be the atmospheric pressure or a pressure lower than the latter.

Under conditions which will be explained in detail later, the oxygen under mean pressure is received by device 2, in which duct 5 ends, this device 2 being also supplied with air under high pressure by means of compressor 4. Device 2 delivers, on the one hand, oxygen under the high pressure, through a duct 7, and on the other hand, through a duct 8, a residual gas under a low pressure which is for example atmospheric pressure.

FIG. 2 represents in more detail an apparatus corresponding to FIG. 1, in which each PSA device comprises two adsorbers, respectively 10,11 and 12,13. These adsorbers are filled with an adsorbent which preferentially adsorbs nitrogen with respect to oxygen, such as a molecular sieve of type 5A or 13X. If desired, each adsorber may include at its base a layer of another adsorbent having a desiccating effect, such as alumina or silica gel.

Each adsorber includes an inlet at its lower end, and an outlet at its upper end. When the treated gas circulates from the inlet to the outlet, this defines a so-called co-current direction of circulation. The opposite direction of circulation is called counter-current.

In the case where a molecular sieve is used, if the difference between the low pressure of the PSA HP and the high pressure of the PSA LP is of the order of 2 bars and the pressure of oxygen HP is of 10 to 15 bars, the volume of adsorbent required by the PSA HP is between 10 and 15 times smaller than that of the PSA LP, the flow of air supplied to the PSA HP being moreover 5 to 8 times smaller than the flow of air supplied to the PSA LP.

A duct 14 connects the outlet of the compressor 3 to the inlet of the adsorbers 10 and 11 which are also connected to the duct 6 which is used to discharge the residual gas to the atmosphere; the latter is provided with a flow regulating device 15.

The duct 5 is connected to the outlet of each adsorber 10 to 13 and comprises a flow regulating device 18. Diluting and equilibrating ducts 19 and 20, each provided with a flow regulating device, connect together the outlets of the adsorbers 10 and 11.

A duct 21 connects the outlet of the compressor 4 to the inlets of the adsorbers 12 and 13, which are also connected to the duct 8 which is used for discharging residual gas to the atmosphere; the latter is provided with a regulating device 22. The ducts 6 and 8 end in a common duct or air exit 23 provided with a muffler 24.

The outlets of the adsorbers 12 and 13 are connected to the high pressure oxygen production duct via a buffer container 25, and they are connected together by means of an equilibrating duct 26 provided with a flow regulating device.

The apparatus also comprises a certain number of valves enabling to assist in the operating cycle which will be described below with reference to FIG. 3.

In FIG. 3, where the times t are indicated on the abscissae and the absolute pressures P on the ordinates, the lines which are oriented with arrows indicate the movements and destinations of the gaseous flows; when the arrows are parallel to the ordinate axis, they indicate in addition the direction of circulation in an adsorber: when an arrow is in the direction of the increasing ordinates (towards the upper portion of the diagram), the direction of the flow in the adsorber is co-current; if the arrow directed towards the upper portion of the diagram is located below the line indicating the pressure of the adsorber, the flow enters the adsorber through the inlet end of the adsorber; if the arrow, directed towards the upper portion, is located above the line indicating the pressure, the flow exits from the adsorber through the outlet end of the adsorber, the inlet and outlet ends being respectively those of the gas introduced into the adsorber under consideration and of the gas withdrawn from this same adsorber in the production stage; when an arrow is in the direction of the decreasing ordinates (towards the bottom of the diagram), the direction of the flow in the adsorber is counter-current. If the arrow directed towards the bottom is located below the line indicating the pressure of the adsorber, the flow exits from the adsorber through the inlet end of the adsorber; if the arrow directed towards the bottom is located above the line indicating the pressure, the flow enters the adsorber through the outlet end of the adsorber, the inlet and outlet ends being always those of the gas introduced and the gas withdrawn in the production stage. On the other hand, there are indicated in full lines the gaseous flows which are exclusively concerned with an adsorber and in dotted lines the gaseous flows originating from or in the direction of other adsorbers.

FIG. 3 comprises in fact two diagrams, including a lower diagram D1 illustrating the cycle, so-called "cycle LP" of an adsorber of the device 1, for example adsorber 10, and an upper diagram D2 which illustrate that, so-called "cycle HP", of the adsorber corresponding to device 2, which is for example adsorber 12. The cycles of the two other adsorbers 11 and 13 are deduced from time gap T/2, where T represents the duration of the cycle.

In this example, the stages of the two cycles correspond in time and will therefore be described in parallel fashion. Cycle LP evolves between atmospheric pressure Pa and a high pressure Plp comprised between 3 and 5 bars, while cycle HP evolves between atmospheric pressure and a high pressure Php situated for example between 10 and 15 bars. The durations T of the cycles HP and LP are the same, and are of the order of 1 to 3 mn for example.

The cycles LP and HP comprise the following stages:
(1) from t=0 to t1:
   cycle LP : the adsorber 10 co-currently produces oxygen at medium pressure and at an increasing pressure up to pressure Plp, air being introduced co-currently via its inlet.
   cycle HP : the adsorber 12 is counter-currently recompressed from atmospheric pressure to a pressure at most equal to Plp, by introduction of a portion of the gas produced by the adsorber 10.
(2) from t1 to t2 :
   cycle LP : the adsorber 10 is co-currently decompressed to pressure Pel by pressure equilibration with the other adsorber 11 at the start of the recompression (phase (5) described below).
   cycle HP : the adsorber 12 is recompressed to pressure Pe2, simultaneously, co-currently by means of air introduced through its inlet end and counter-currently with gas originating from the equilibration of pressures with the second adsorber 13 stage (5) described below.
(3) from t2 to t3 :
   cycle LP : the adsorber 10 is counter-currently decompressed to atmospheric pressure by contact with air.
   cycle HP : the adsorber 12 is co-currently recompressed with air, to a pressure substantially equal to Php.
(4) from t3 to t4 :
   cycle LP : the adsorber 10 undergoes a dilution at a pressure substantially equal to atmospheric pressure by means of gas withdrawn from the gas produced in the other adsorber 11 in stage (1) described above, the gas circulating in counter-current.
   cycle HP : the adsorber 12 co-currently produces oxygen at a pressure in the neighbourhood of Php, air being co-currently introduced through the inlet of this adsorber.
(5) from t4 to t5 :

cycle LP : the adsorber 10 is recompressed from atmospheric pressure to the intermediate pressure Pe1 on the one hand by co-currently introducing the air to be treated, through its inlet end, on the other hand by counter-currently introducing a rich oxygen gas produced in the adsorber 11 in stage (2) described above, i.e. by equilibrating the pressure between the two adsorbers.

cycle HP : the adsorber 12 is co-currently decompressed to an intermediate pressure Pe2. The gas extracted is used to counter-currently recompress the other adsorber 13 in stage (2) described above, i.e. by equilibrating the pressures between the two adsorbers.

(6) from t5 to t6=T :

cycle LP : adsorber 10 is recompressed to a pressure very close to Plp by means of co-currently introduced air.

cycle HP : the adsorber is counter-currently decompressed to atmospheric pressure, by contact with air.

It should be noted that the durations of the various stages (1) to (6) are equal for the two cycles only for simplicity reasons, but could be different. However, if stages (1) of the two cycles, where the two adsorbers 10 and 12 are connected in series, are not simultaneous and of the same duration, it is necessary to use a supplementary buffer capacity for medium pressure oxygen.

Preferably, high pressure oxygen produced in stage (4) is stored in the buffer container 25 to give a regular production on line 7. As indicated in dotted line, as a variant, during stage (3) of cycle HP, it is possible to simultaneously recompress adsorber 12 with co-currently introduced air and with counter-currently introduced gas taken from the buffer capacity 25. On the other hand, by selecting the durations of the stages so that $t4-t1=T/2$, the compressors 3 and 4 continuously feed the respective devices 1 and 2.

Also as a variant, as indicated in dotted line in FIG. 3, the stage (1) of cycle HP may also include a dilution, by allowing a flow of gas to escape by the inlet to the adsorber, or else this stage (1) can be divided into two steps : from $t=0$ to $t'1$, dilution under atmospheric pressure with oxygen produced by adsorber 10, and, from $t'1$ to $t1$, recompression with medium pressure oxygen from atmospheric pressure to Plp.

Figure 4:
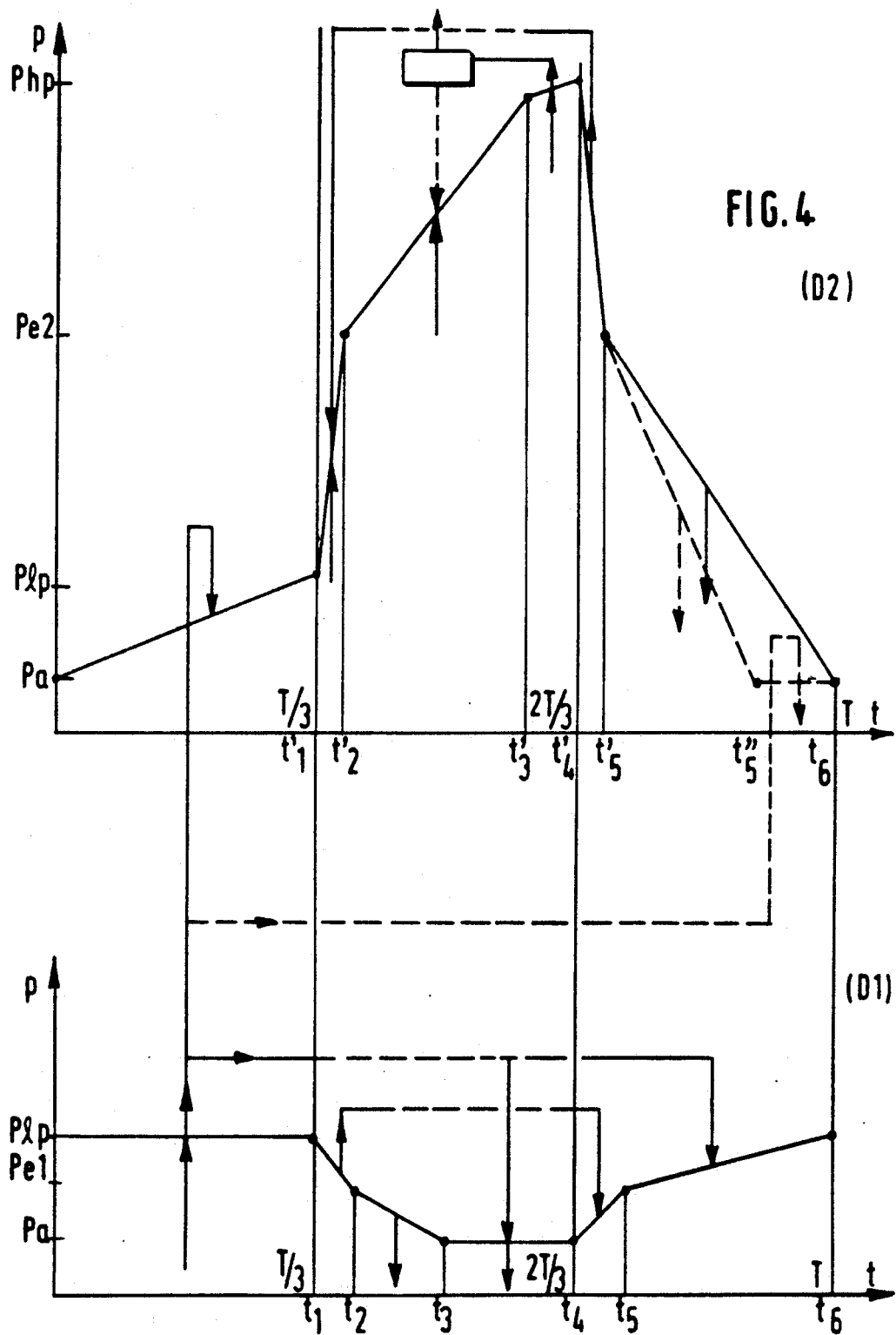
FIGS. 4 and 5 are analogous diagrams corresponding to two variants.

The cycle illustrated in FIG. 4 corresponds to the case wherein each device 1,2 includes three adsorbers. The cycles have a time gap of T/3 from an adsorber LP (or HP) to the next one. Otherwise, the same stages are essentially the same as previously, in the same order, except that the recompression of the adsorber LP is carried out without admitting air, i.e. only with counter-current flow, by equilibrating the pressures in stage (5) and, in stage (6), by introducing medium pressure oxygen withdrawn at the outlet of another adsorber LP in stage (1). On the other hand, the durations of the stages are different between the two cycles, only stage (1) being simultaneous for the two cycles from $t=0$ to $t1=t'1=T/3$. Moreover, stages (4) of the two cycles end at the same moment $t4=t'4=2T/3$; the two air compressors consequently supply continuously the respective devices 1 and 2.

Also indicated in FIG. 4, in dotted line, is the variant of the cycle HP in which there is provided, when decompression is over, a dilution stage of the adsorber at atmospheric pressure with gas produced by an adsorber LP in stage (1). Moreover, the end of the recompression of the adsorber HP (stage (3)) may require, as previously, a simultaneous supply of high pressure oxygen (counter-current) and high pressure air (co-current).

Figure 5:
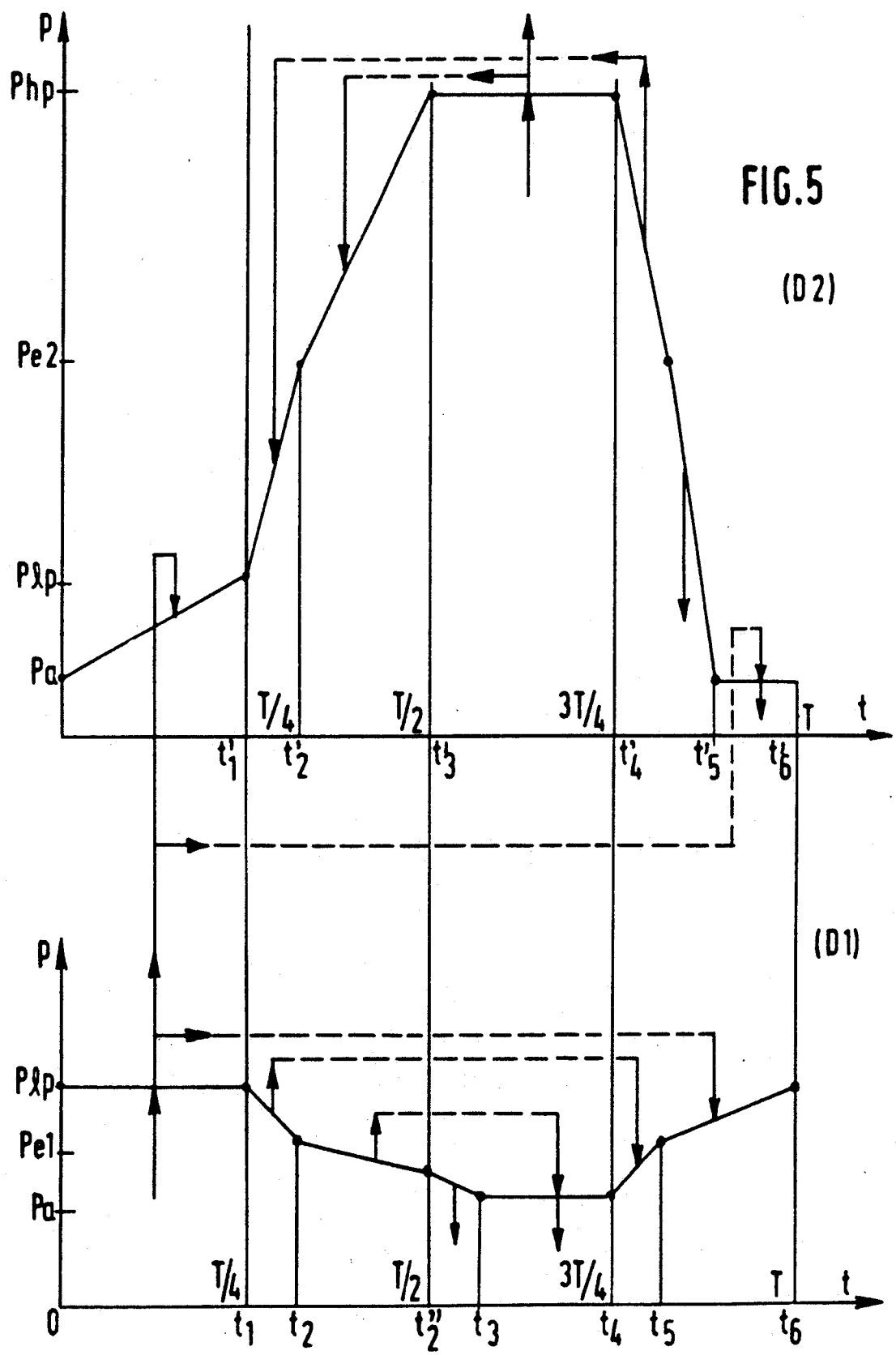

FIG. 5 shows a cycle absolutely analogous to that of FIG. 4, in a form including a dilution stage in the cycle HP, carried out with devices 1 and 2 comprising four adsorbers. The cycle LP differs from that of FIG. 4 in that the dilution gas is no longer withdrawn from the production of the adsorber LP in stage (1), but comes from a second co-current decompression of another adsorber LP, from t2 to $t''2>t3$. With the indications of FIG. 3, we have $t1=t'1=T/4$, $t''2=t'3=T/2$, $t4=t'4=3T/4$, $t6=t'6=T$. As the stage (4) of cycle HP has a duration T/4, the production of high pressure oxygen is continuous, and the buffer container 25 can be removed. Moreover, as illustrated, the final recompression of the adsorber HP (stage (3)) can be carried out only with counter-current flow by means of high pressure oxygen.

The equation $t'4-t'3=t1=T/4$ implies that the two air compressors supply again permanently devices 1 and 2.

In the present specification, "equilibrating" means an operation consisting in connecting two adsorbers having different pressures, in order to reduce the difference of the pressures; this operation can either be carried out until the pressures are equal, or can be interrupted before obtaining this equilization.

The device illustrated in FIG. 2 corresponds to the cycles represented in full lines in FIG. 3. One skilled in the art will easily understand how it can be modified to carry out the other cycles described above.

It should also be noted that the number of adsorbers and the adsorbants of devices 1 and 2 can be different, as well as the durations of the two cycles. The high and low pressures of the cycle LP can be selected from ranges which are very different.

A still another:

the pressures used for producing medium pressure oxygen and high pressure oxygen can vary in the course of a same cycle;

the production of high pressure oxygen can be completed by a production starting with co-current decompression, the inlet of the adsorber being closed;

the low pressure of cycle HP can be lower than atmospheric pressure, a vacuum pump or the like being then used at the end of the decompression step;

the supply of air to device 1 can be obtained by withdrawing air at the outlet of an intermediate stage of the compressor 4.

The essential role of device 2 is to compress at high pressure then to flush the oxygen so compressed, by means of HP air. If the high pressure is not too high, device 2 will additionally produce a small quantity of additional high pressure oxygen from HP air introduced in device 2.

Many variants are possible for cycle BP. The mean pressure oxygen can even be supplied with another apparatus than PSA.

We claim:

1. A process for producing oxygen at a first superatmospheric pressure by means of a high pressure PSA device comprising bringing n adsorbers, into which oxygen is introduced that has been produced at a second pressure, intermediate between atmospheric pressure and the first pressure, to the first pressure, wherein each of the n adsorbers undergoes a cycle, having a duration T, comprising the following stages:
(a) a first recompression from a third pressure lower than the second pressure, to substantially said second pressure, during which oxygen at the second pressure is introduced into a first end of the adsorber;
(b) a second recompression from the second pressure to substantially said first pressure;
(c) a production stage, during which an oxygen-containing gas substantially at said first pressure is introduced into a second end of the adsorber, the first end being open, and
(d) a decompression to the third pressure, the cycle being shifted with a frequency T/n from one adsorber to a subsequent adsorber.

2. Process according to claim 1, wherein, between stages (c) and (d), the cycle comprises a stage of complementary production, at the first pressure by co-current decompression of the adsorber, said second end being closed.

3. Process according to claim 1, wherein during at least a portion of stage (b), oxygen substantially at the first pressure is introduced through said first end of the adsorber.

4. Process according to claim 1, wherein during at least a portion of stage (b), there is carried out a pressure equilization with another adsorber in stage (d).

5. Process according to claim 1, wherein during at least a portion of stage (b), an oxygen-containing gas is introduced through said second end of the adsorber.

6. Process according to claim 1, wherein the cycle comprises, between the end of stage (d) and the start of stage (a) or simultaneously to the latter, a stage (e) of counter-current dilution by means of oxygen at the second pressure.

7. Process according to claim 1, wherein the third pressure is lower than atmospheric pressure.

8. Process according to claim 1, wherein the cycle of each adsorber of the low pressure PSA device comprises a production stage at the second pressure simultaneously to stage (a) of an adsorber of the high pressure PSA device and during which, an outlet end of the adsorber of the low pressure PSA device is connected to said first end of the adsorber of the high pressure PSA device.

9. Process according to claim 1 wherein n=4 and the stage (c) lasts T/4.

10. An apparatus for producing oxygen at a first super-atmospheric pressure, comprising means for producing oxygen at a second pressure, intermediate between atmospheric pressure and the first pressure, and means for raising the oxygen pressure from the second pressure to the first pressure, said pressure raising means comprising a high-pressure PSA device including feeding means for feeding an oxygen-containing gas at the first pressure to said high pressure device.

11. Apparatus according to claim 10, wherein said means for producing oxygen at the second pressure comprise a low pressure PSA adsorption device connected to the outlet of a compressor discharging at the second pressure.

12. Apparatus according to claim 11, wherein said oxygen-containing gas being air, said feeding means comprising an air compressor having at least two stages including an intermediate stage also feeding the low pressure PSA device.

* * * * *